(12) United States Patent
Liu et al.

(10) Patent No.: US 10,666,730 B2
(45) Date of Patent: May 26, 2020

(54) STORAGE ARCHITECTURE FOR HETEROGENEOUS MULTIMEDIA DATA

(71) Applicant: TuSimple, Inc., San Diego, CA (US)

(72) Inventors: Dangyi Liu, San Diego, CA (US); Anthony Hitchcock Thomas, San Diego, CA (US); Kai Zhou, San Diego, CA (US); Yidi Zhang, San Diego, CA (US); Ruiliang Zhang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 27 days.

(21) Appl. No.: 15/796,780

(22) Filed: Oct. 28, 2017

(65) Prior Publication Data

US 2019/0132392 A1 May 2, 2019

(51) Int. Cl.
*H04L 29/08* (2006.01)

(52) U.S. Cl.
CPC .......... *H04L 67/1097* (2013.01); *H04L 67/02* (2013.01); *H04L 67/12* (2013.01); *H04L 67/2842* (2013.01)

(58) Field of Classification Search
CPC .. H04L 67/02; H04L 67/1097; H04L 67/2842
USPC ....................................................... 709/217
See application file for complete search history.

(56) References Cited

U.S. PATENT DOCUMENTS

| | | | |
|---|---|---|---|
| 6,777,904 B1 | 8/2004 | Degner | |
| 7,103,460 B1 | 9/2006 | Breed | |
| 7,689,559 B2 | 3/2010 | Canright | |
| 7,783,403 B2 | 8/2010 | Breed | |
| 7,844,595 B2 | 11/2010 | Canright | |
| 8,041,111 B1 | 10/2011 | Wilensky | |
| 8,064,643 B2 | 11/2011 | Stein | |
| 8,082,101 B2 | 12/2011 | Stein | |

(Continued)

FOREIGN PATENT DOCUMENTS

| | | | |
|---|---|---|---|
| EP | 1754179 A1 | 2/2007 | |
| EP | 2448251 A2 | 5/2012 | |

(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

(Continued)

*Primary Examiner* — Minh Chau Nguyen
(74) *Attorney, Agent, or Firm* — Paul Liu; Jim Salter

(57) ABSTRACT

Various embodiments for implementing a system and method for managing and querying semi-structured, heterogeneously-typed sensor data in a distributed environment are disclosed. Example embodiments include: enabling data communications between a plurality of compute nodes and a plurality of physical data storage devices via an application programming interface (API) layer, a cache management layer, a server layer, and a storage layer; and receiving a data request from at least one of the plurality of compute nodes at the API layer, the data request including an identification of a topic of a dataset, the topic including a metadata file, a data file, and an index file, the index file including at least one pointer into the data file.

20 Claims, 9 Drawing Sheets

(56) References Cited

U.S. PATENT DOCUMENTS

| | | |
|---|---|---|
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,993,951 B2 | 3/2015 | Schofield |
| 9,002,632 B1 | 4/2015 | Emigh |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman |
| 9,317,776 B1 | 4/2016 | Honda |
| 9,330,334 B2 | 5/2016 | Lin |
| 9,342,074 B2 | 5/2016 | Dolgov |
| 9,355,635 B2 | 5/2016 | Gao |
| 9,365,214 B2 | 6/2016 | Ben Shalom |
| 9,399,397 B2 | 7/2016 | Mizutani |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,535,423 B1 | 1/2017 | Debreczeni |
| 9,555,803 B2 | 1/2017 | Pawlicki |
| 9,568,915 B1 | 2/2017 | Berntorp |
| 9,587,952 B1 | 3/2017 | Slusar |
| 9,720,418 B2 | 8/2017 | Stenneth |
| 9,723,097 B2 | 8/2017 | Harris |
| 9,723,099 B2 | 8/2017 | Chen |
| 9,738,280 B2 | 8/2017 | Rayes |
| 9,746,550 B2 | 8/2017 | Nath |
| 9,753,816 B2* | 9/2017 | Mehta .................. G06F 16/162 |
| 9,848,046 B2* | 12/2017 | Mehta .................. H04L 67/1095 |
| 2007/0230792 A1 | 10/2007 | Shashua |
| 2008/0249667 A1 | 10/2008 | Horvitz |
| 2009/0040054 A1 | 2/2009 | Wang |
| 2010/0049397 A1 | 2/2010 | Lin |
| 2010/0226564 A1 | 9/2010 | Marchesotti |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2014/0145516 A1 | 5/2014 | Hirosawa |
| 2014/0198184 A1 | 7/2014 | Stein |
| 2015/0062304 A1 | 3/2015 | Stein |
| 2015/0353082 A1 | 12/2015 | Lee |
| 2016/0037064 A1 | 2/2016 | Stein |
| 2016/0094774 A1 | 3/2016 | Li |
| 2016/0129907 A1 | 5/2016 | Kim |
| 2016/0165157 A1 | 6/2016 | Stein |
| 2016/0210528 A1 | 7/2016 | Duan |
| 2016/0321381 A1 | 11/2016 | English |
| 2016/0375907 A1 | 12/2016 | Erban |
| 2017/0017903 A1* | 1/2017 | Gray .......................... G06F 3/14 |
| 2017/0039765 A1* | 2/2017 | Zhou .................... G06T 19/006 |
| 2018/0114136 A1* | 4/2018 | Kumar .................. G06N 7/005 |
| 2019/0035275 A1* | 1/2019 | Nishi ...................... G08G 1/16 |

FOREIGN PATENT DOCUMENTS

| | | | |
|---|---|---|---|
| EP | | 2463843 A2 | 6/2012 |
| EP | | 2463843 A3 | 7/2013 |
| EP | | 2761249 A1 | 8/2014 |
| EP | | 2463843 B1 | 7/2015 |
| EP | | 2448251 A3 | 10/2015 |
| EP | | 2946336 A2 | 11/2015 |
| EP | | 2993654 A1 | 3/2016 |
| EP | | 3081419 A1 | 10/2016 |
| WO | WO/2005/098739 A1 | | 10/2005 |
| WO | WO/2005/098751 A1 | | 10/2005 |
| WO | WO/2005/098782 | | 10/2005 |
| WO | WO/2010/109419 A1 | | 9/2010 |
| WO | WO/2013/045612 | | 4/2013 |
| WO | WO/2014/111814 A2 | | 7/2014 |
| WO | WO/2014/111814 A3 | | 7/2014 |
| WO | WO/2014/201324 | | 12/2014 |
| WO | WO/2015/083009 | | 6/2015 |
| WO | WO/2015/103159 A1 | | 7/2015 |
| WO | WO/2015/125022 | | 8/2015 |
| WO | WO/2015/186002 A2 | | 12/2015 |
| WO | WO/2015/186002 A3 | | 12/2015 |
| WO | WO/2016/135736 | | 9/2016 |
| WO | WO/2017/013875 A1 | | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

(56) References Cited

OTHER PUBLICATIONS

Hou, Xiaodi and Yuille, Alan and Koch, Christof, "A Meta-Theory of Boundary Detection Benchmarks", arXiv preprint arXiv:1302. 5985, 2013.
Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.
Li, Yanghao and Wang, Naiyan and Liu, Jiaying and Hou, Xiaodi, "Demystifying Neural Style Transfer", arXiv preprint arXiv:1701. 01036, 2017.
Hou, Xiaodi and Zhang, Liqing, "A Time-Dependent Model of Information Capacity of Visual Attention", International Conference on Neural Information Processing, pp. 127-136, Springer Berlin Heidelberg, 2006.
Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.
Li, Yanghao and Wang, Naiyan and Liu, Jiaying and Hou, Xiaodi, "Factorized Bilinear Models for Image Recognition", arXiv preprint arXiv:1611.05709, 2016.
Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineenng, Center for Environmental Research and Technology, University of California, Riverside, CA 92521, date unknown.
Kyoungho Ahn, Hesham Rakha, "The Effects of Route Choice Decisions on Vehicle Energy Consumption and Emissions", Virginia Tech Transportation Institute, Blacksburg, VA 24061, date unknown.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612. 06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.
Jain, Suyong Dull, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703. 04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech. edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611. 09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, The Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Kyoungho Ahn, Hesham Rakha, "The Effects of Route Choice Decisions on Vehicle Energy Consumption and Emissions", Virginia Tech Transportation Institute, date unknown.

* cited by examiner

STORAGE ARCHITECTURE FOR HETEROGENEOUS MULTIMEDIA DATA

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

The disclosed subject matter relates to the field of data access storage methods and systems, and in particular, a system and method for managing and querying semi-structured, heterogeneously-typed sensor data in a distributed environment.

BACKGROUND

Users or compute nodes typically interact with data stored in network attached storage (NAS) through use of a distributed file system, which is a computer program providing routines to access and manipulate data stored in NAS. Well-known examples include the Hadoop File System (HDFS) and the Network File System (NFS) protocols. The three primary concerns with NAS are security, efficiency, and ease of use. Security means allowing only authorized persons or machines to access data, efficiency means that data access should be as fast as possible, and ease of use means that accessing data in NAS should be simple for application programmers. However, conventional data storage architectures do not provide an efficient solution that addresses all of these requirements without any trade-offs. Additionally, current data storage architectures cannot provide efficient data storage access in a shared environment in support of semi-structured, heterogeneously-typed sensor data with ease of use.

SUMMARY

The data storage access system of an example embodiment (denoted DatasetStore) and the related design paradigm as described herein is configured for the distributed storage and querying of heterogeneous multimedia time-series datasets produced by autonomous driving vehicles. Heterogeneous data means data items or datasets, which may contain different data types or shapes (e.g., video data, global positioning system (GPS) data, and the like). A dataset is a collection of data streams created by sensors of varying types mounted on an autonomous driving vehicle. A data stream consists of one of more data items collected by a sensor, and a timestamp denoting the time at which a particular datum was acquired. Thus, data streams are a form of time series data. The data storage access system of an example embodiment as disclosed herein provides at least four key features. The first feature is a design paradigm, which provides a structured way to represent collections of sensor data produced by autonomous driving vehicles. The second feature is a set of computer software-implemented routines to query and join data produced by different sensors. The third feature is a tool for importing data into the data storage access system, and the fourth feature is a tool for transferring datasets between geographically disparate regions. To the best of our knowledge, no comparable data storage access system exists.

The data storage access system of the example embodiment includes a computer software system (denoted DataLink), which provides efficient and secure access to data stored in an array of computer storage devices connected by a communication network. Modern data sets commonly exceed the volume of physical data storage available on a single device. Consequently, data is may be stored across multiple devices, which are linked through a communication network. This storage architecture is known as "network attached storage" (NAS). Users or compute nodes typically interact with data stored in NAS through use of a distributed file system, which is a computer program or software system providing routines to access and manipulate data stored in NAS. In the various example embodiments disclosed herein, we present a novel system for accessing data in NAS using HTTP requests and a sophisticated caching system. To access data stored in NAS, a client machine or compute node issues an HTTP request to a remote computer (server). The server verifies the user has permission to access the desired data and, if so, retrieves the data from NAS. All user access requests are logged to a secure server, which is accessible only by trusted individuals. When data is returned to the user or compute node, a local copy is saved into a cache, which improves system performance by minimizing the amount of network access. Additionally, cached data can be transparently split into smaller portions to improve the granularity of the cache. Our system can be easily integrated with Kerberos™ and IPA™, two popular tools to manage user accounts and authentication. Our system is designed as a replacement for the popular NFS protocol and improves on NFS by moving authentication and logging to a remote trusted server, which improves security. We additionally use HTTP rather than a custom protocol, which makes our system very easy to integrate with existing code as the majority of popular programming languages supports issuing and processing HTTP requests.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
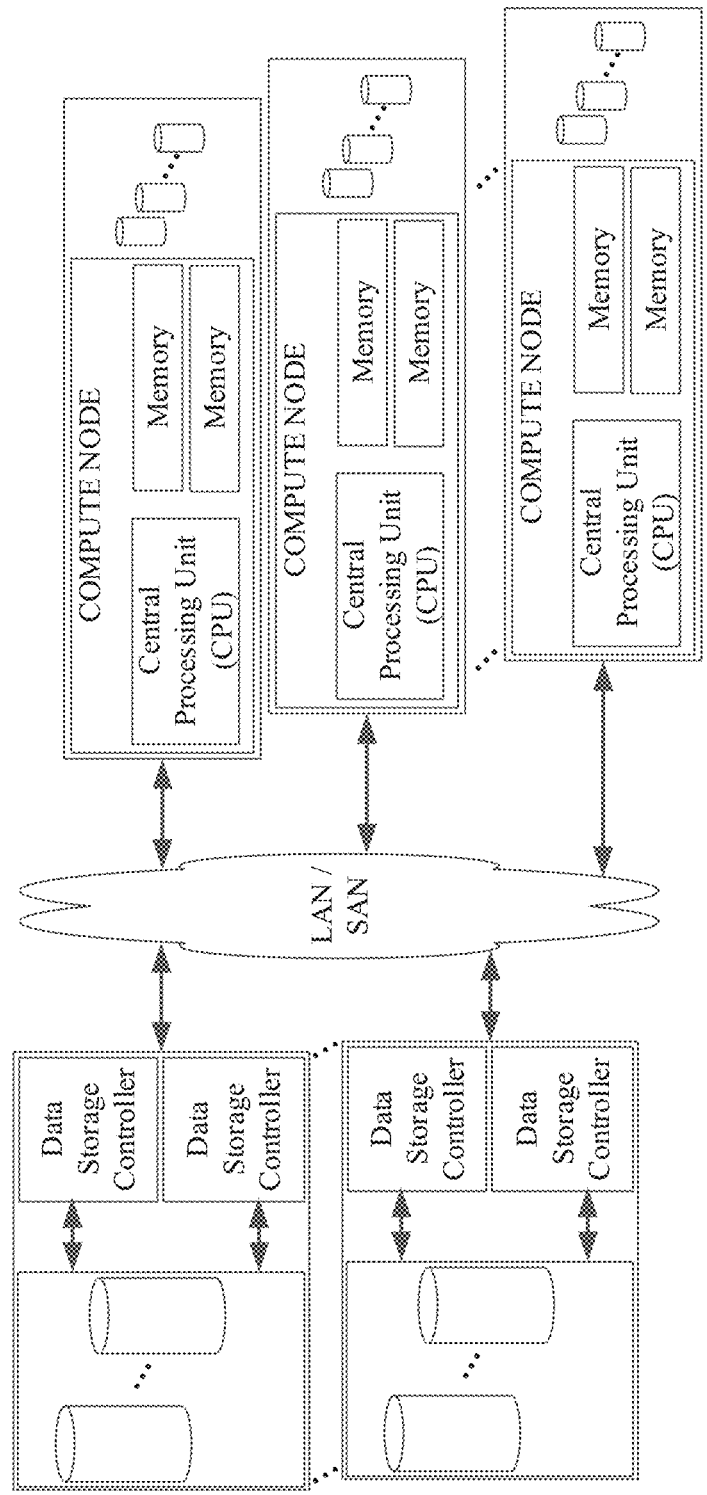
FIG. 1 illustrates a direct attach storage configuration of conventional systems.

In the following detailed description, a reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided a system and method for managing and querying semi-structured, heterogeneously-typed sensor data in a distributed environment. The various embodiments described herein provide a new data storage architecture to meet the above requirements, including security, efficiency and ease of use.

A problem addressed by the data storage architecture described herein is the efficient storage, access, and management of semi-structured, heterogeneously-typed sensor data in a distributed environment. For example, sensor data gathered and processed by and for autonomous vehicles can be in a variety of different semi-structured, heterogeneously-typed formats. In various embodiments, the data storage architecture described herein efficiently manages data with complex characteristics. For example, the following:

- test vehicles and autonomous vehicles gather and process many types of sensor data: such as, global positioning system (GPS) data, video streams, inertial measurement unit (IMU) data, radar data, laser range finder/LIDAR, internal vehicle subsystem data (e.g., an O2 monitor, a fuel gauge, an engine oil temperature), etc.;
- autonomous vehicle sensors can read data at different rates and produce different types of output;
- data is not consistently sized—packets of sensor data may be of varying length;
- the total volume of data is very large (e.g., many TB);
- users or compute nodes often only want small slices of larger data items; and
- raw data is immutable, but users or compute nodes may want to associate derived data with raw data.

The efficient storage, access, and management of semi-structured, heterogeneously-typed sensor data, as described above, in a distributed environment can present several challenges:

- speed—efficient and timely random access to binary data must be provided;
- security—users or compute nodes should only be able to access relevant data and should not be able to modify raw data;
- flexibility—users or compute nodes should not be constrained in what they can do with data;
- consistency—methods to access and manipulate data must be consistent across a code base; and
- ease-of-use—interacting with data should not require learning a large new application programming interface (API) or vocabulary.

Conventional data storage architectures have been unable to provide solutions that successfully balance the requirements and challenges presented by semi-structured, heterogeneously-typed sensor data. One reason for this is the relatively new emerging technology in autonomous vehicles and the unique collections of data required and used by autonomous vehicles. For example, many conventional data storage architectures are configured for relational data. Data management has traditionally been addressed by relational database management systems (RDBMS). RDBMS requires tabular data related by key-foreign key relations and work best with a structured data model. Semi-structured, heterogeneously-typed sensor data does not have well defined "relationships." That is, data may be loosely related spatially and/or temporally. Additionally, semi-structured, heterogeneously-typed sensor data may not be tabular. Semi-structured, heterogeneously-typed sensor data consists of streams of (possibly nested) sensor data. As such, the data is semi-structured. Individual data items produced by a sensor have a schema; but, the overall data does not. Moreover, the dominant operation in supporting the data needs of autonomous vehicles is the reading and processing of compressed video data. Finally, databases for semi-structured data and NOSQL databases like HDF5 and Mongo have steep learning curves and do not offer a desired level of flexibility in how data is stored. Integrating these systems with operating system (OS) level caching can be difficult.

FIG. 1 illustrates a software representation of a conventional direct attached storage configuration with a user-space distributed file system. The challenge is that the compute and storage capacities cannot grow independently of one another. This limits the expansion capabilities to meet differing compute and storage requirements of multiple workloads sharing the system, and would result in utilization inefficiencies. Given that storage media is tied within a compute node, all remote access to the storage media must go over a cluster network typically shared with other critical data traffic among distributed workloads. This impacts performance on both data and storage traffic. As a result, this conventional direct attached storage configuration cannot satisfy the requirements of users or compute nodes needing access to semi-structured, heterogeneously-typed sensor data.

Figure 2:
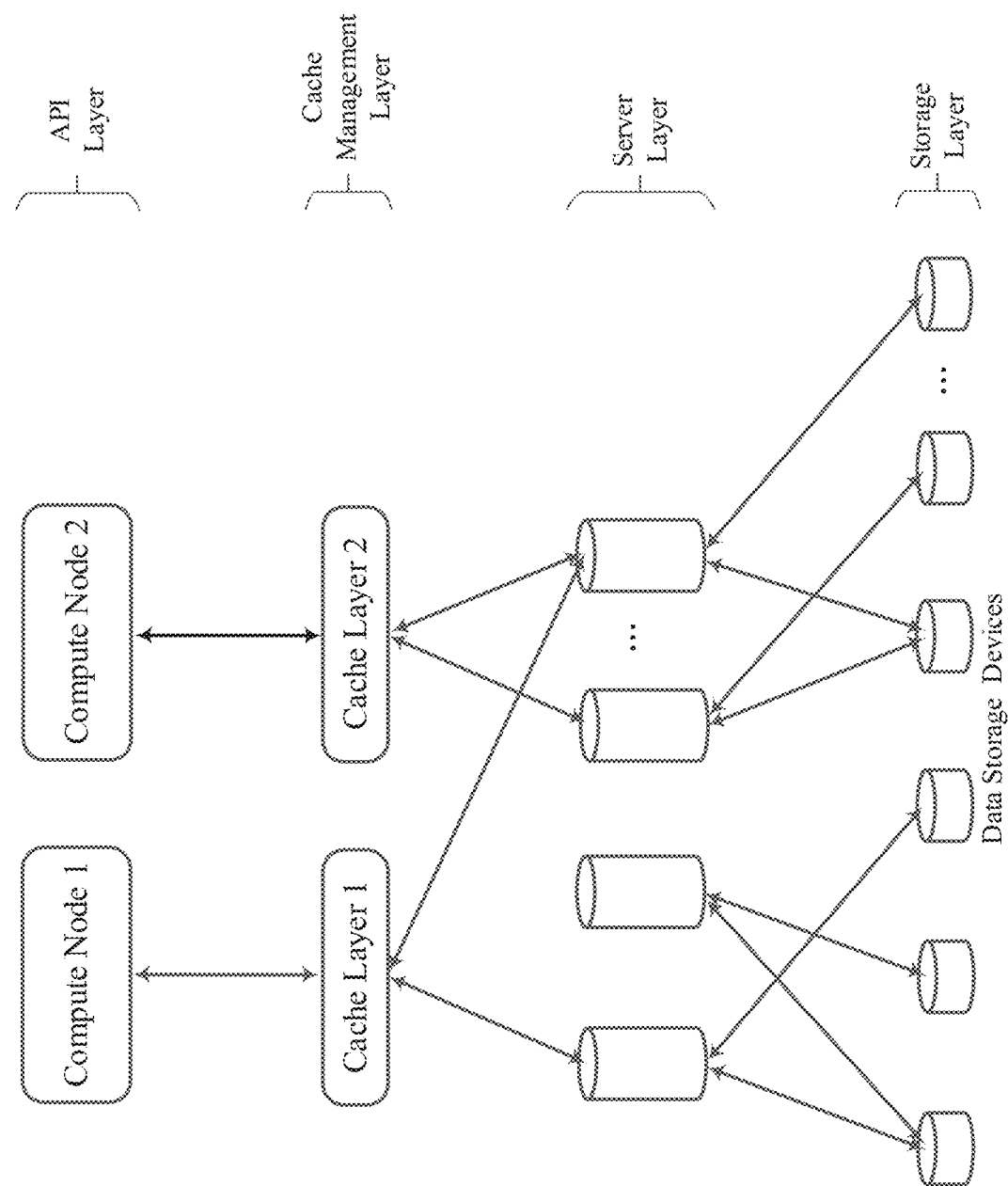
FIG. 2 illustrates a high level structure of the data storage access system of an example embodiment.

FIG. 2 illustrates a high level structure of the data storage access system of an example embodiment. The data storage access system of the example embodiment consists of four distinct components: the storage or data layer, the server layer, the cache management layer, and the application programming interface (API) layer. The first three layers are completely transparent to the user.

The storage or data layer stores physical data on an array of computer storage devices connected by a networked file system (NFS). During normal operation, users or compute nodes cannot access or view data directly (but can mount NFS for direct access if a server is down). Data is stored in self-describing directories. In the example embodiment, JavaScript™ Object Notation or JSON metadata files provide necessary context. JSON is an open-standard file format that uses human-readable text to transmit data objects consisting of attribute—value pairs and array data types (or any other serializable value). JSON is a very common data format used for asynchronous browser/server communication, including as a replacement for XML in some AJAX-style systems. It will be apparent to those of ordinary skill in the art in view of the disclosure herein that other metadata formats can be equivalently used. In the example embodiment, SQLite indexes provide efficient random access pointers to binary data. SQLite is a relational database management system contained in a C programming library. In contrast to many other database management systems, SQLite is not a client—server database engine. Rather, it is embedded into the end program. It will be apparent to those of ordinary skill in the art in view of the disclosure herein that other means for effecting random access to binary data can be equivalently used.

The server layer provides tools to control user or compute node access to the storage layer and to log data access. The server layer receives user or compute node requests to access raw data. The server layer coordinates authentication and logs access requests. The server layer also reads data from NFS and returns data to users or compute nodes via Hypertext Transfer Protocol (HTTP). HTTP is a well-known application protocol for distributed, collaborative, and hypermedia information systems. HTTP is a common data communication protocol used on the World Wide Web (WWW). Additionally, the server layer can maintain a local file system cache.

The cache management layer maintains a least-recently-used (LRU) cache of data on local data storage media. The operating system (OS) can handle in-memory caching. Because data access from the storage layer can be time consuming, the cache management layer is provided to improve system efficiency by maintaining a local copy of data on a user's compute node, thus minimizing the frequency with which data must be accessed from the storage layer. The goal is to reduce the frequency of data requests from the server to the storage layer. In an example embodiment, data access requests are routed through a cache manager of the cache management layer. The cache manager is configured to return locally stored (cached) requested data if available in the local cache (cache hit). The cache manager is also configured to fetch the requested data via the server layer and the storage layer if the requested data is not locally stored and not available in the local cache (cache miss). Data can be downloaded and stored locally in the cache in smaller chunks (e.g., 10-50 MB) to allow for finer grained caching. The cache manager makes the process of reading partitioned files completely transparent to the end user or compute node.

The API layer is a software system interface, which allows the end user or compute node to access, query, and manipulate datasets maintained in the data storage access system. The API layer provides a unified set of software-implemented methods for querying, accessing, and manipulating the data. To accomplish the goal of effecting ease-of-use, the API layer provides approximately ten to fifteen primary methods to support data access and manipulation. As such, API layer does not require a significant learning curve to enable user or compute node usage. The API layer further supports time series alignment using several processes, including interpolation methods. The time series alignment processes of an example embodiment are described in more detail below. The API layer allows users or compute nodes to transparently associate the output of software processes (derived data) with raw data. As such, the API layer allows the convenient integration of derived data and raw data, which is important for supporting the variety of sensor data in autonomous vehicles. The API layer also automates selection of training and test subsets of data. Because the usage of machine learning processes in support of autonomous vehicles is common and critical, the support of the automated selection of training and test subsets of data is an important feature provided by the data storage access system described herein. Additionally, the API layer of an example embodiment can gather detailed statistics and analytics on data usage patterns, the time spent performing input/output (I/O) operations, and the like, which can be used to optimize the performance of the data storage access system. Finally, an example embodiment of the software system interface in support of the data storage access system can be written in pure Python™ to allow easy integration with OpenCV™ and ROS™. Python™ is a widely used high-level programming language for general-purpose programming. As an interpreted language, Python™ has a design philosophy that emphasizes code readability (notably using whitespace indentation to delimit code blocks rather than brackets or keywords), and a syntax that allows programmers to express concepts in fewer lines of code than might be used in languages such as C++ or Java™. The use of Python™ in an example embodiment also helps to accomplish the goal of effecting ease-of-use. OpenCV™ (Open Source Computer Vision) is a library of programming functions mainly aimed at real-time computer vision. The Robot Operating System (ROS)™ is a flexible framework for writing software for use on robots. It is a collection of tools, libraries, and conventions that aim to simplify the task of creating complex and robust robot behavior across a wide variety of robotic platforms. ROS defines the schemas for the sensor data collected by autonomous driving vehicles in the example embodiment. It will be apparent to those of ordinary skill in the art in view of the disclosure herein that other sensor message formats may be used.

Referring again to FIG. 2, a pool of physical computing machines (e.g., computer servers) in the server layer can manage the storage of physical data on data storage media (e.g. disks, solid state memory devices, and/or the like) in the storage layer. Users or compute nodes can request access to the stored data using the API in the API layer, which consists of software routines for accessing and manipulating the stored data. The server layer performs authentication and logging of user or compute node data access requests and balances the workload over the servers storing the raw data. The cache management layer manages a local cache of recently accessed data maintained on each user's computer or compute node to minimize the number of network accesses.

Figure 3:
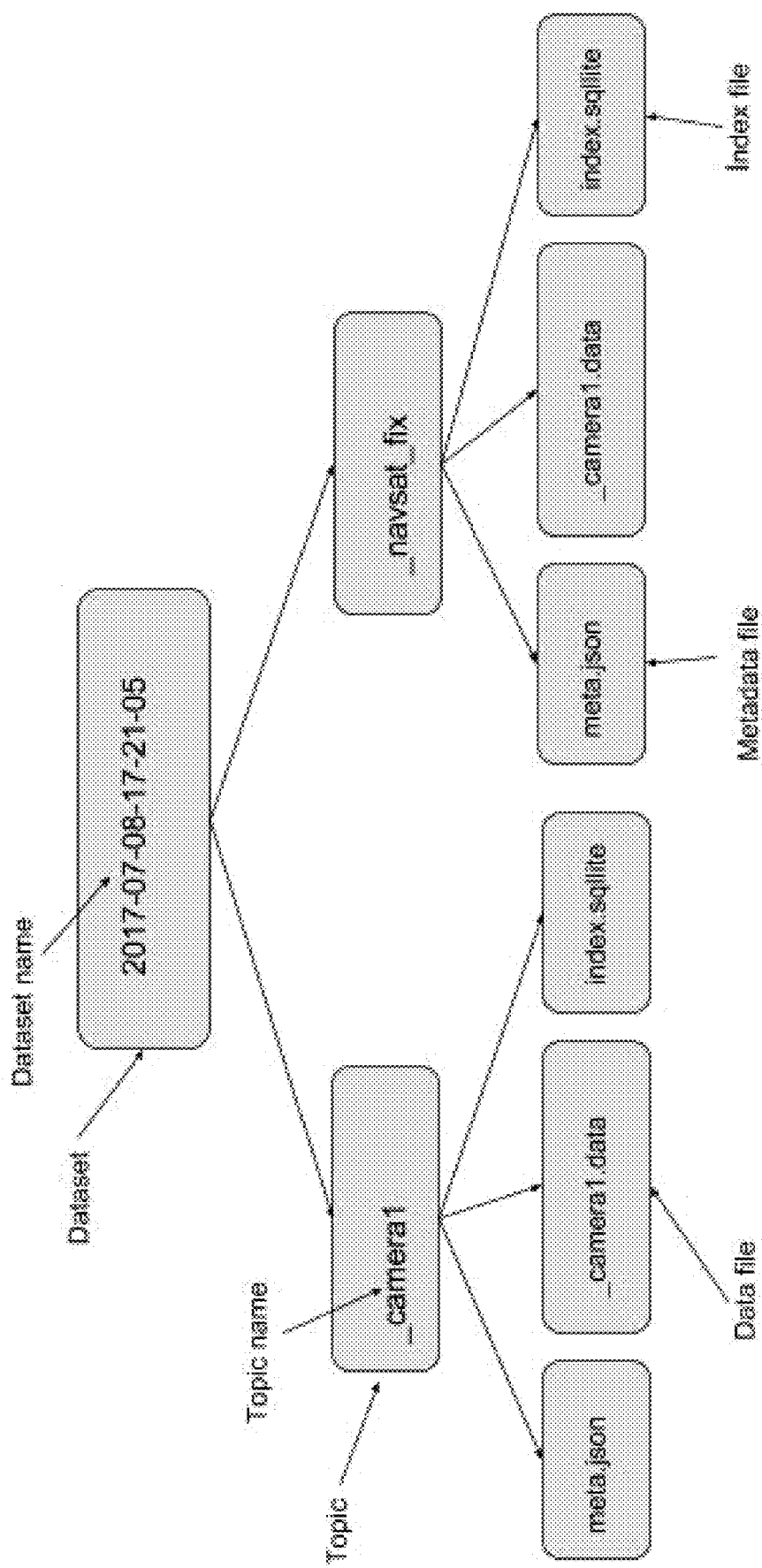
FIG. 3 illustrates a structure of a single dataset of an example embodiment.

In an example embodiment, the data moved between the four layers described above can be structured as datasets. FIG. 3 illustrates a structure of a single dataset. A dataset is a collection of one or more topics. A topic is a data stream produced by a sensor on an autonomous driving vehicle and/or the output of another computer program. The terms "topic" and "message" were first used to represent units of data by the developers of ROS. A data stream is a sequence of sensor output ordered by time. In an example embodiment, a topic can consist of three or more files. It will be apparent to those of ordinary skill in the art in view of the disclosure herein that a greater or lesser number of files in a topic may be used. In the example embodiment, a topic can include a metadata file, a data file, and an index file. In the example shown in FIG. 3, a sample dataset includes two topics: a topic named "_camera1" and a topic named "_naysat_fix." Three files are associated with each of the two sample topics. The metadata file (meta.json) of the "_camera1" topic in the example contains information needed by humans and/or computer programs to read and understand the data for the corresponding topic. In an example embodiment, the metadata can be formatted as a JSON file. The second file of the "_camera1" topic in the example is a data file, which contains the actual data stream associated with the topic. The data stream in the data file can be arranged as a plurality of time-sequenced messages. The third file of the "_camera1" topic in the example is a SQLite index file, which contains the timestamp of each message in the topic along with the beginning offset (in bytes) in the data file and the length (in bytes) of each message. The index file allows for fast access to a range of timestamps in a topic. As shown in the example of FIG. 3, each topic of the dataset can have a corresponding set of metadata, data, and index files. The dataset itself can be named with a dataset name.

In an example embodiment, a topic metadata file (meta.json) format is described below. The metadata file of each topic can have among the following data elements:
source: The data generating process (e.g., vehicle, sensor, software process output, or the like)
stat: Statistics about the data for this topic
　count: Number of messages in this topic
　ts_begin: The first timestamp in this topic
　fps: The frames per second for this topic
　ts_end: The last timestamp in this topic
index: The name of the SQLite index file for this topic
name: The human readable name of this topic
file: The filename on the data storage media for the underlying data of this topic
Format: The data type for this topic (e.g. raw, JSON, Python pickle file, etc. . . . )
Type_def: For ROS messages only. The definition of the ROS message type.
Type: For ROS messages only. The name of the ROS message type. Used to decode a ROS message into a Python object.

Figure 4:
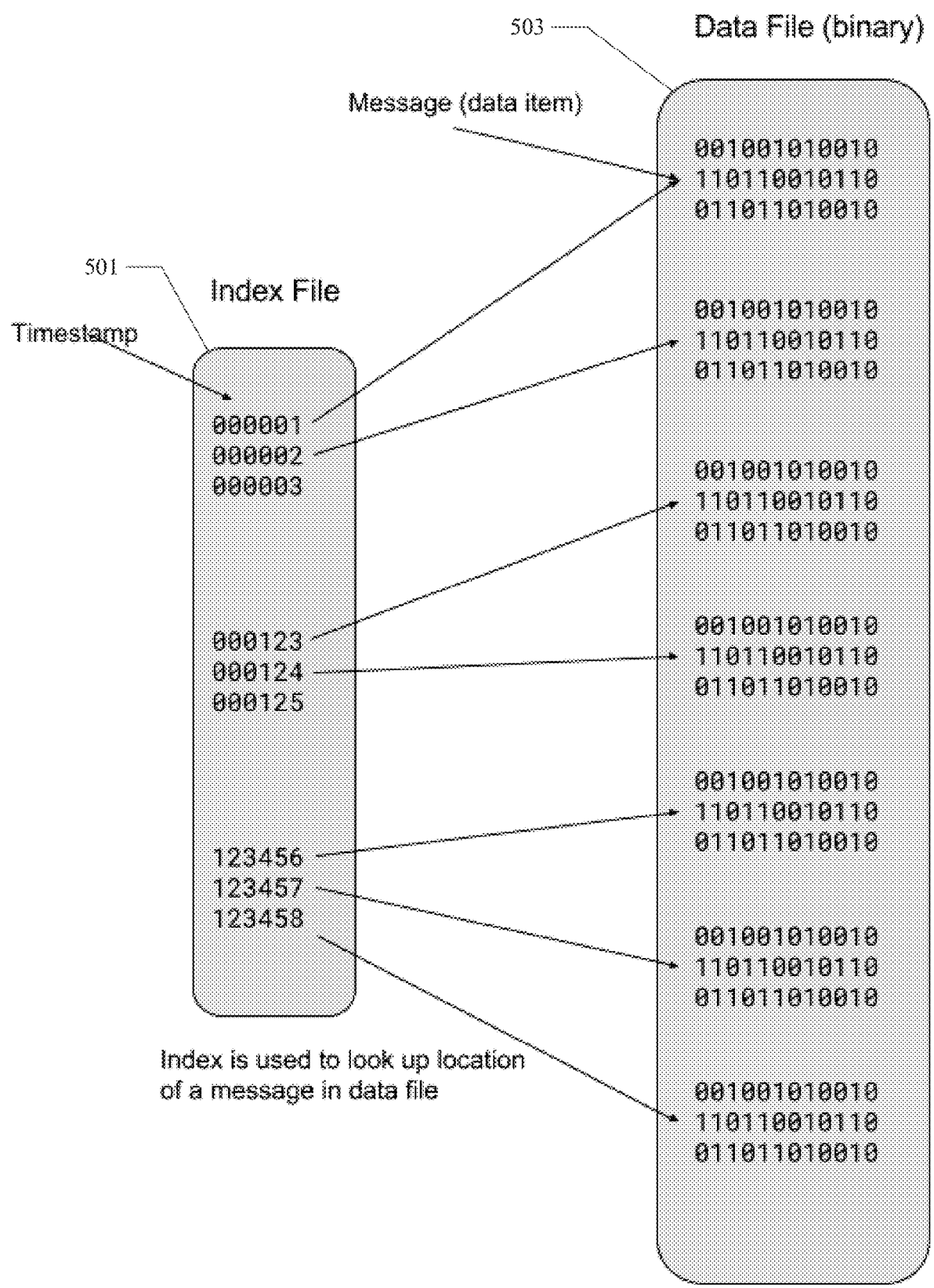
FIG. 4 illustrates a SQLite index file used to support quasi-random access in a data file.

FIG. 4 illustrates an example of the SQLite index file 501 used in the example embodiment to support quasi-random access in a data file 503 of a topic. As shown in FIG. 4, the index file 501 stores a SQLite index table, which includes pointers or offsets that can be used to locate the position and length of a particular message (identified by its timestamp) in the topic data file 503. The index table maintains an index over the timestamp attribute, which allows for random access into the data file 503 in O(log n) time.

Figure 5:
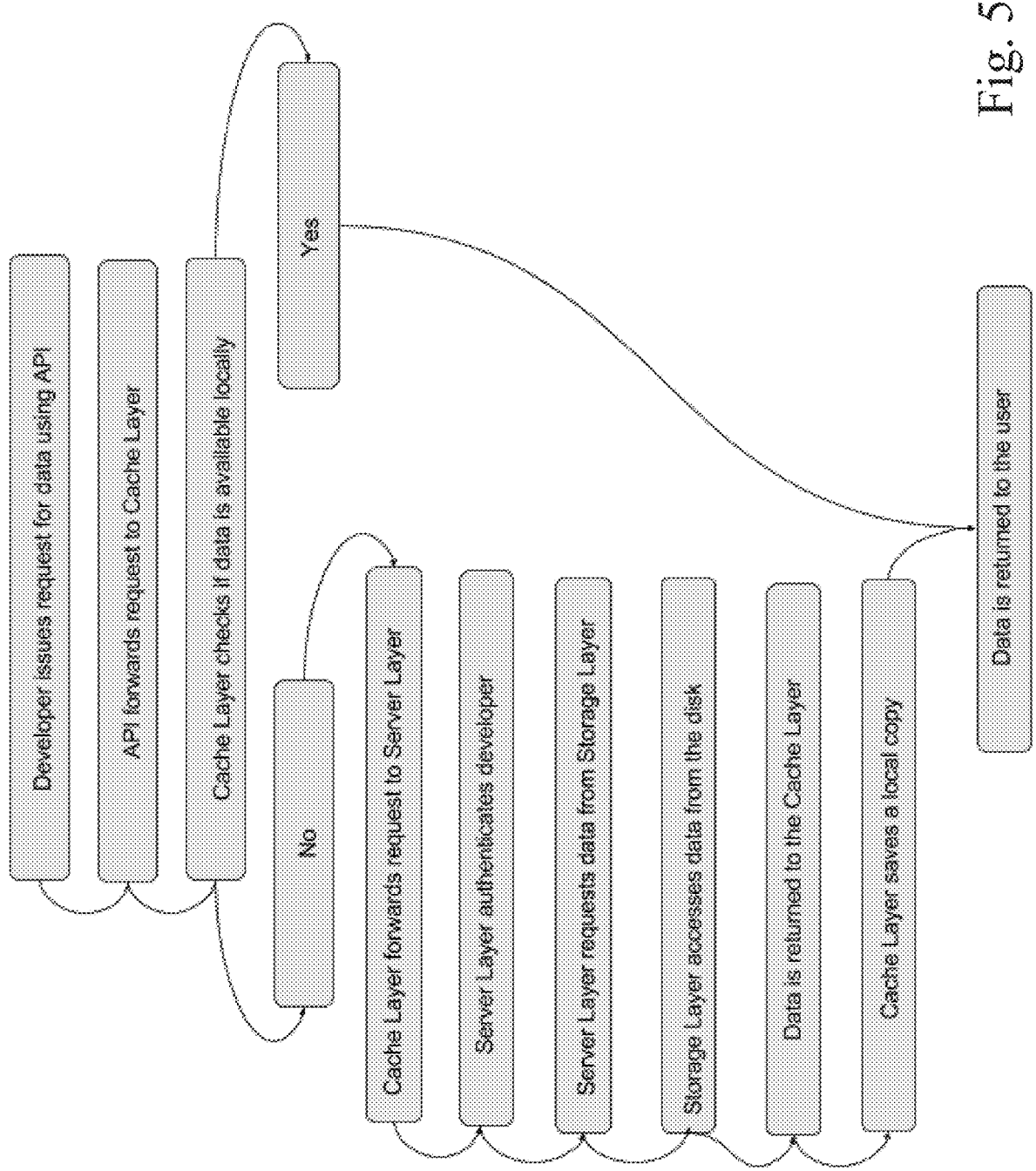
FIG. 5 illustrates the cache and server layer workflow in an example embodiment.

FIG. 5 illustrates the cache and server layer workflow in an example embodiment. As shown in FIG. 5, a developer or compute node can issue a request for data using one or more API methods or calls. In response to the API call, the API layer can forward the request to the cache management layer. The cache management layer can determine if the requested data currently resides in the local cache. If the requested data currently resides in the local cache (cache hit), the requested data can be fetched from the local cache and returned to the requesting user or compute node. If the requested data does not currently reside in the local cache (cache miss), the cache management layer forwards the data request to the server layer. The server layer can authenticate the requesting user or compute node by validating the credentials of the requesting user or compute node. If the requesting user or compute node is authenticated, the server layer can issue a request for the data to the storage or data layer. The storage layer can fetch the requested data from the physical data storage media. The fetched data is returned to the cache management layer. The cache management layer saves a copy of the fetched data in a local cache. The fetched data is returned to the requesting user or compute node.

Figure 6:
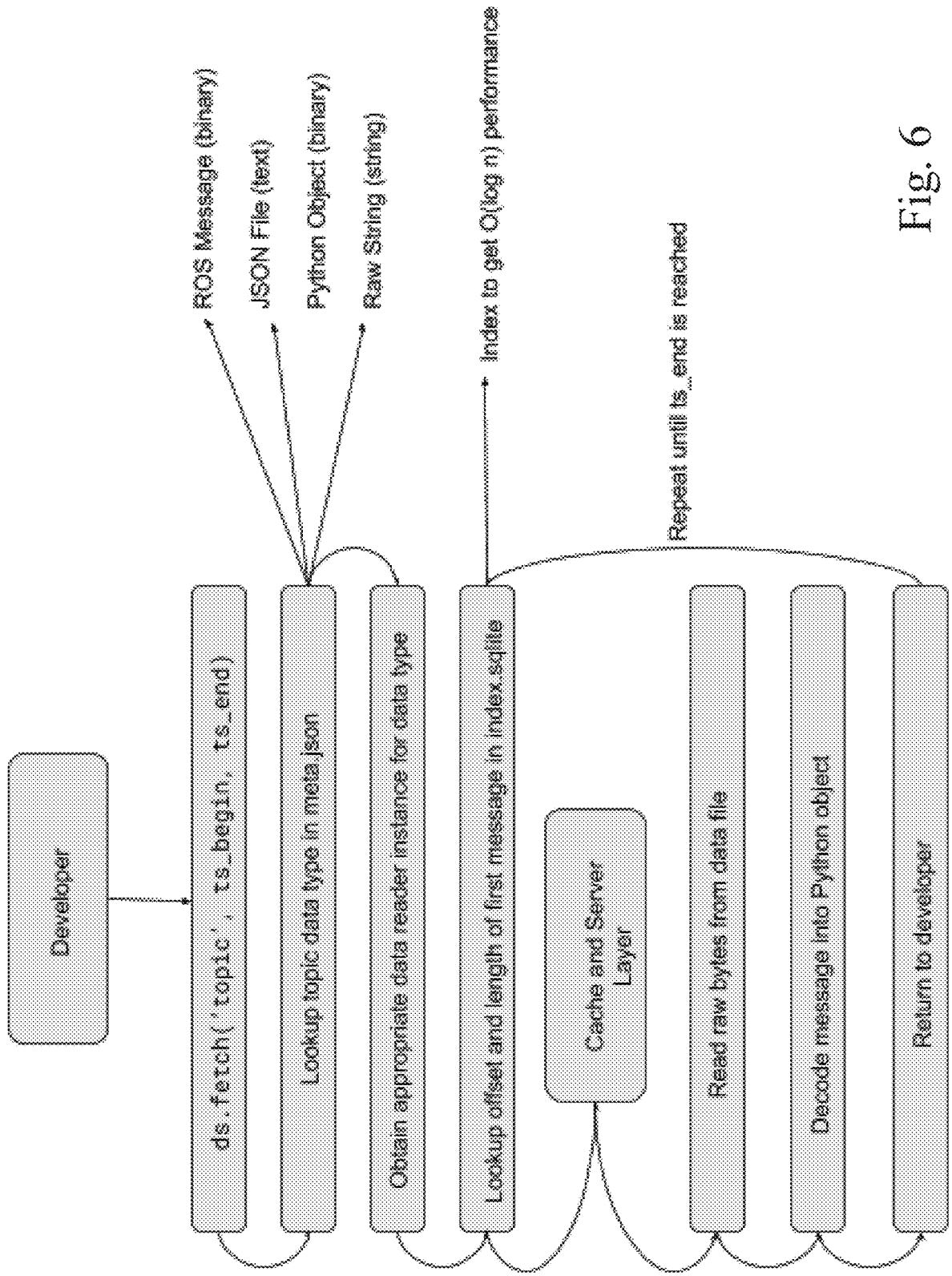
FIG. 6 illustrates the data access workflow in an example embodiment.

FIG. 6 illustrates the data access workflow in an example embodiment. FIG. 6 further illustrates the internal workflow of the data storage access system to read raw data from the data storage device. In the example shown in FIG. 6, a developer or compute node can issue a request for data using one or more API methods or calls (e.g., "dsfetch('topic', ts_begin, ts_end)." In response to this request, the API layer can obtain the metadata file for the requested topic. The API layer can determine the data type for the requested topic by use of the metadata file. In the example shown in FIG. 6, the data type can be an ROS message (binary) type, a JSON file (text) type, a Python object (binary) type, or a raw string (string) type. It will be apparent to those of ordinary skill in the art in view of the disclosure herein that a variety of different data types can be supported by alternative embodiments. Once the API layer determines the data type for the requested topic, a corresponding data reader or parser for the determined data type can be obtained or identified. The API layer can use the index file for the requested topic to look up the offset and length of the first message in the data file of the requested topic. The offset and length values can be used to identify the particular data blocks needed from the data storage media. This information identifying the offset and length values of the message or the information identifying the particular data blocks needed from the data storage media can be sent in a request for data to the cache management layer and the server layer. As described above, the cache management layer can determine if the requested data is in the local cache. If the requested data is resident in the local cache, the requested data is fetched from the local cache and converted or decoded into a data object (e.g., a Python object) and returned to the requesting developer or compute node. If the requested data is not resident in the local cache, the server layer can authenticate the developer or compute node and issue a request for the data to the storage or data layer. The storage or data layer can return the requested data to the cache management layer via the server layer. The cache management layer can save a copy of the fetched data in the local cache and convert or decode the fetched data into a data object (e.g., a Python object) and return the data object to the requesting developer or compute node. This process can be repeated until the entire requested topic is returned to the requesting developer or compute node.

Figure 7:
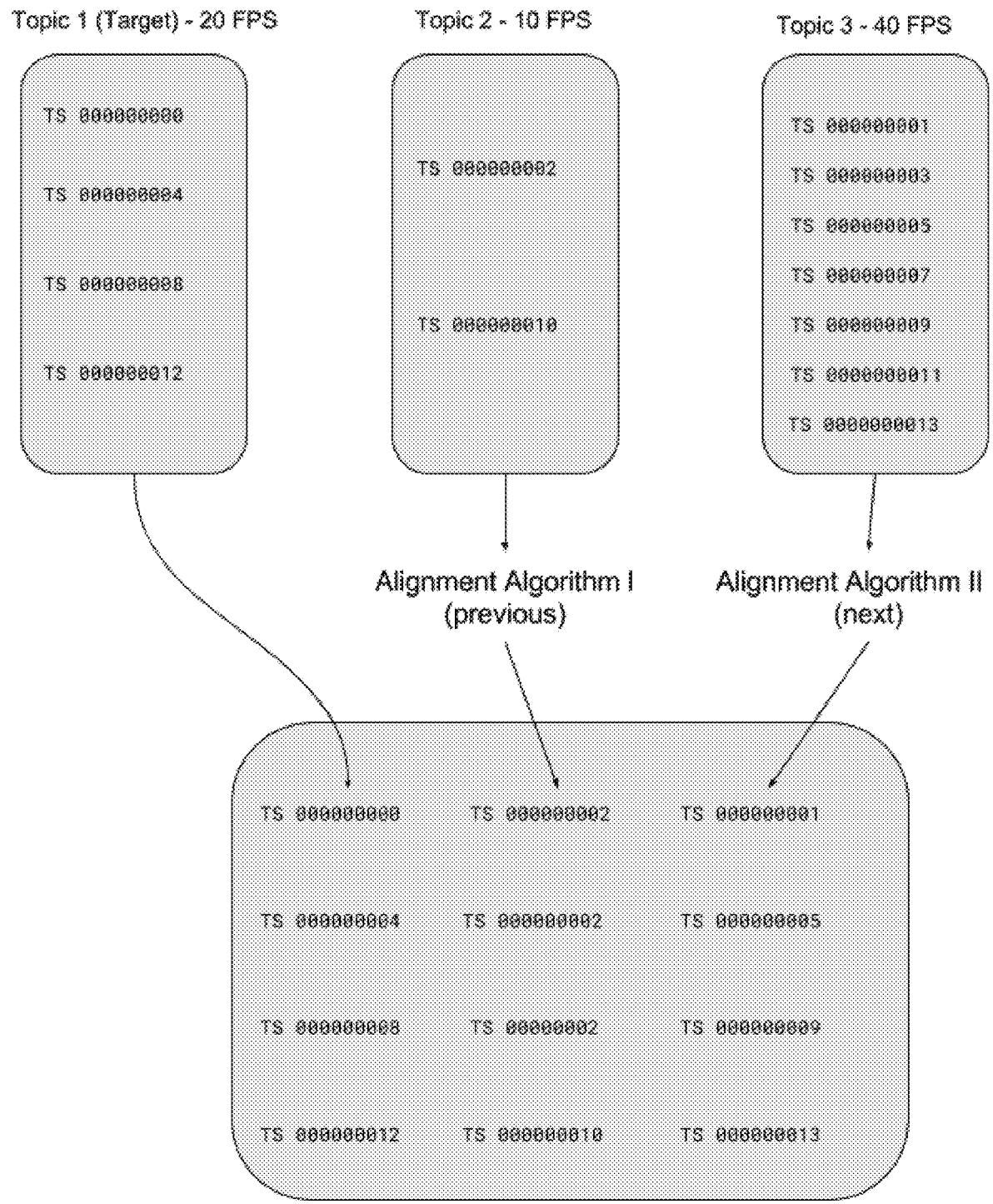
FIG. 7 illustrates an example of the alignment of inconsistent time series in an example embodiment.

FIG. 7 illustrates an example of the process used in an example embodiment for the alignment of inconsistent time series in topics of one or more datasets. FIG. 7 further illustrates the process used to align topics containing sensor data produced at different rates. The data storage access system of an example embodiment contains one or more API methods for automatically aligning the time-series of two or more topics. The user or compute node can use the API layer to specify the names of the topics on which to perform a time-series alignment operation. One or more API methods can be invoked by the user or compute node to specify the "target" topic to which the timestamps of the other specified topics will be aligned. In the example shown in FIG. 7, a Topic 1 has been specified as the target topic. Topics 2 and 3 have been specified as topics, for which timestamps will be aligned with the timestamps of the target topic (Topic 1). As a result, inconsistent time series in topics of one or more datasets can be aligned. This process is particularly important in the context of machine learning systems. Machine learning systems are typically expressed as algebraic operations over matrices, which necessitates a rectangular data structure without missing data. The alignment of timestamps in this context is very important.

Figure 8:
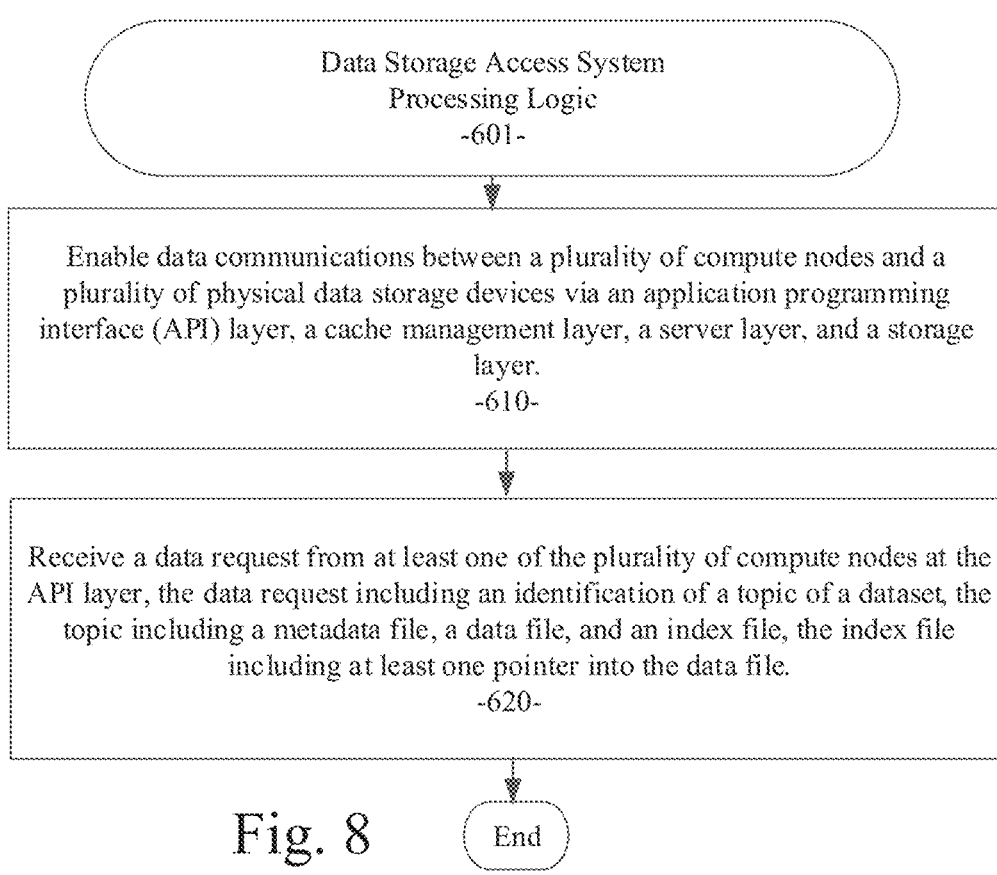
FIG. 8 is a flow diagram illustrating the basic processing flow for a particular example embodiment of the data storage access system as described herein.

FIG. 8 is a flow diagram illustrating the basic processing flow 401 for a particular embodiment of a system and method for managing and querying semi-structured, heterogeneously-typed sensor data in a distributed environment. As shown, an example embodiment includes: enabling data communications between a plurality of compute nodes and a plurality of physical data storage devices via an application programming interface (API) layer, a cache management layer, a server layer, and a storage layer (processing block 610); and receiving a data request from at least one of the plurality of compute nodes at the API layer, the data request including an identification of a topic of a dataset, the topic including a metadata file, a data file, and an index file, the index file including at least one pointer into the data file (processing block 620).

Figure 9:
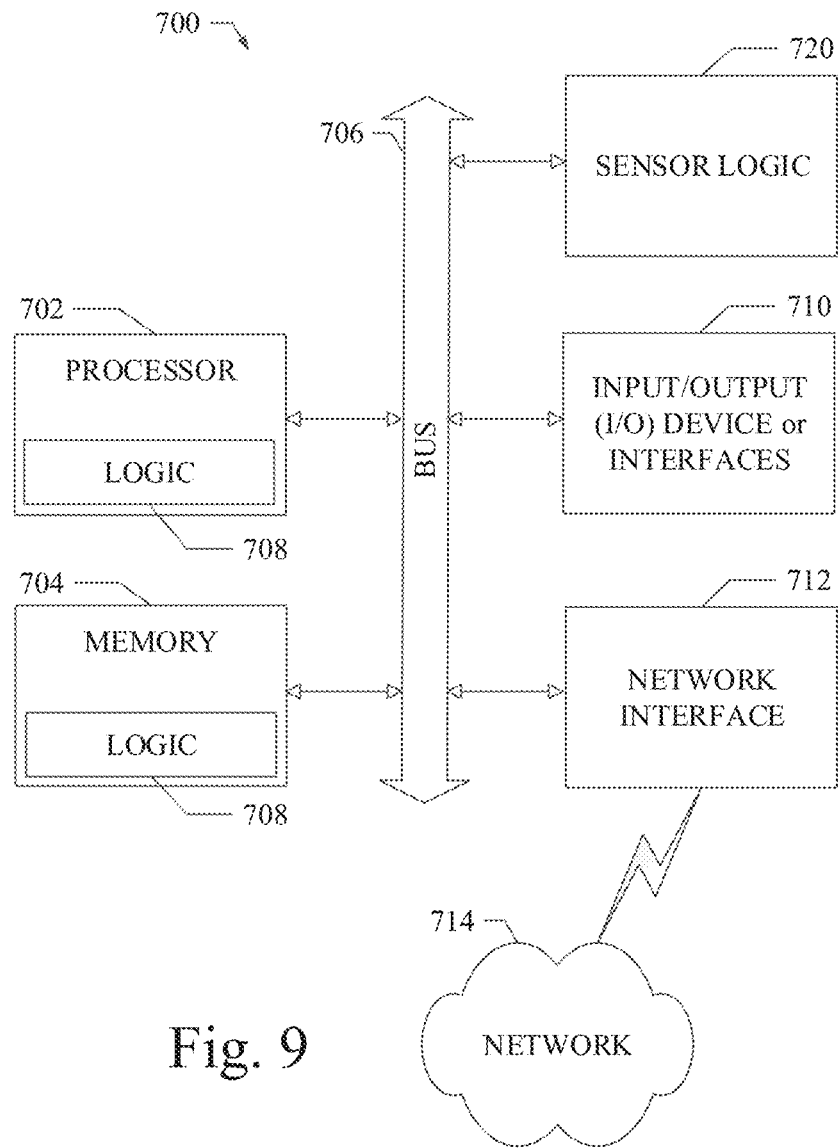
FIG. 9 shows a diagrammatic representation of a machine in the example form of a data processor within which a set

FIG. 9 shows a diagrammatic representation of a machine in the example form of a mobile computing and/or communication system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example mobile computing and/or communication system 700 includes a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, and optionally a network interface 712. In an example embodiment, the network interface 712 can include a standard wired network interface, such as an Ethernet connection, or one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth, IEEE 802.11x, and the like. In essence, network interface 712 may include or support virtually any wired and/or wireless communication mechanisms by which information may travel between the mobile computing and/or communication system 700 and another computing or communication system via network 714. Sensor logic 720 provides the sensor hardware and/or software to capture sensor input from a user action or system event that is used to assist in the configuration of the data storage system as described above.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the twit "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

Applications that may include the apparatus and systems of various embodiments broadly include a variety of electronic devices and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 704 or 708 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or embodying a set of instructions for execution by the machine and that cause the machine to perform any one or more of the methodologies described herein. The term "machine-readable medium" shall accordingly be taken to include, but not be limited to, solid-state memories, optical media, and magnetic media.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. The following claims are hereby incorporated into the Detailed Description, with each claim standing on its own as a separate embodiment.

Thus, as described herein, a system and method for managing and querying semi-structured, heterogeneously-typed sensor data in a distributed environment are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A system comprising:
   a plurality of compute nodes being in data communication with a data network;
   a plurality of physical data storage devices being in communication with the data network;
   sensor logic to capture sensor input from an autonomous vehicle; and
   a data storage access system enabling communication of data between the plurality of compute nodes and the plurality of physical data storage devices via an application programming interface (API) layer, a cache management layer, a server layer, and a storage layer, the data storage access system receiving a data request from at least one of the plurality of compute nodes at the API layer, the data request including an identification of a topic of a dataset, the topic including a metadata file, a data file, and an index file, the index file including at least one pointer into the data file, the dataset being a heterogeneous multimedia time-series dataset including a plurality of dataset topics, each dataset topic corresponding to a data stream created by a sensor and captured by the sensor logic of the autonomous vehicle, at least two dataset topics of the plurality of dataset topics corresponding to different data streams having different data types.

2. The system of claim 1 further including a set of computer software-implemented routines configured to query and join data produced by different sensors.

3. The system of claim 1 further including a set of computer software-implemented routines configured to import data into the data storage access system.

4. The system of claim 1 further including a set of computer software-implemented routines configured to transfer datasets between geographically disparate regions.

5. The system of claim 1 wherein the server layer is configured to authenticate an originating compute node of the data request.

6. The system of claim 1 wherein the server layer returns data to an originating compute node of the data request via Hypertext Transfer Protocol (HTTP).

7. The system of claim 1 wherein the storage layer is configured to obtain data corresponding to the topic from at least one of the plurality of physical data storage devices.

8. The system of claim 1 wherein the plurality of physical data storage devices is of a type from the group consisting of a plurality of disk drives and a plurality of solid-state drives (SSDs).

9. The system of claim 1 wherein the dataset includes data obtained from a plurality of sensors of an autonomous vehicle.

10. The system of claim 1 wherein the dataset includes semi-structured, heterogeneously-typed sensor data.

11. A method comprising:
    enabling data communications between a plurality of compute nodes and a plurality of physical data storage devices via an application programming interface (API) layer, a cache management layer, a server layer, and a storage layer;
    using sensor logic to capture sensor input from an autonomous vehicle; and
    receiving a data request from at least one of the plurality of compute nodes at the API layer, the data request including an identification of a topic of a dataset, the topic including a metadata file, a data file, and an index file, the index file including at least one pointer into the data file, the dataset being a heterogeneous multimedia time-series dataset including a plurality of dataset topics, each dataset topic corresponding to a data stream created by a sensor and captured by the sensor logic of the autonomous vehicle, at least two dataset topics of the plurality of dataset topics corresponding to different data streams having different data types.

12. The method of claim 11 further including querying and joining data produced by different sensors.

13. The method of claim 11 further including importing data into the data storage access system.

14. The method of claim 11 further including transferring datasets between geographically disparate regions.

15. The method of claim 11 wherein the server layer is configured to authenticate an originating compute node of the data request.

16. The method of claim 11 wherein the server layer returns data to an originating compute node of the data request via Hypertext Transfer Protocol (HTTP).

17. The method of claim 11 wherein the storage layer is configured to obtain data corresponding to the topic from at least one of the plurality of physical data storage devices.

18. The method of claim 11 wherein the plurality of physical data storage devices is of a type from the group consisting of a plurality of disk drives and a plurality of solid-state drives (SSDs).

19. The method of claim 11 wherein the dataset includes data obtained from a plurality of sensors of an autonomous vehicle.

20. The method of claim 11 wherein the dataset includes semi-structured, heterogeneously-typed sensor data.

* * * * *

UNITED STATES PATENT AND TRADEMARK OFFICE
CERTIFICATE OF CORRECTION

PATENT NO. : 10,666,730 B2
APPLICATION NO. : 15/796780
DATED : May 26, 2020
INVENTOR(S) : Dangyi Liu et al.

It is certified that error appears in the above-identified patent and that said Letters Patent is hereby corrected as shown below:

In the Specification

In Column 6, Lines 52-53, delete ""_naysat_fix."" and insert -- "_navsat_fix." --, therefor.

In Column 7, Line 61, delete ""dsfetch" and insert -- "ds.fetch --, therefor.

In Column 10, Line 11, delete "twit" and insert -- term --, therefor.

Signed and Sealed this
Fourth Day of August, 2020

Andrei Iancu
*Director of the United States Patent and Trademark Office*